E. P. HUDSON, OF NEW YORK, N. Y.

Letters Patent No. 87,937, dated March 16, 1869.

IMPROVEMENT IN THE MANUFACTURE OF VEGETABLE PARCHMENT.

The Schedule referred to in these Letters Patent and making part of the same.

*To all whom it may concern:*

Be it known that I, E. P. HUDSON, of the city, county, and State of New York, have invented an Improved Process for Treating Paper, by which I produce an improved water-proof material, possessing, in a high degree, the qualities of strength, durability, and pliability; and I do hereby declare that the following is a full and exact description thereof.

I first treat the paper with sulphuric acid and water, nearly in the same manner as is done in the process of producing what is called "vegetable parchment," but with certain improvements and precautions in the process, by which to secure a sure and successful result, that is so difficult to attain by the old process.

These improvements, and the apparatus by which I perform the process, I have described in the specification for other Letters Patent, for which I am about to make application.

A brief but sufficient description of this part of the process, in the present specification, is this:

The paper, unsized, is first dipped in or passed through a bath, composed of two volumes of commercial sulphuric acid, $(SO_3HO,)$ and one volume of water, kept at a temperature of 60° Fahrenheit. Then, after washing in clear water, it is passed through a bath of very dilute *aqua ammonia*, to neutralize any acid which may remain in the paper. After washing again in a water-bath, it is passed through a bath of very dilute lime-water. Then, after being washed once more in a bath of clear water, it is ready for treatment by my improved process, as follows:

While the paper is moist, it is immersed in a bath of glycerine, which is rapidly absorbed into the pores thereof, and expels the water therefrom. The paper thereby immediately becomes greatly changed, both in apparent and intrinsic qualities.

It is now quite soft to the touch, very pliable, water-proof, and impervious to air and moisture.

It can be washed, boiled in hot water, doubled, folded, twisted, or subjected to almost any kind of handling, without injury, and will regain its previous elasticity and unbroken smoothness.

It can be sewed like cloth, and be printed with various surfaces, like cloth or leather, or may be embossed.

It may be of any desired color, and may be painted, oiled, varnished, or enamelled.

It is suitable for almost numberless uses; and, since I intend to apply it to all purposes to which it is especially applicable, I will here enumerate a considerable number of them:

First, in various ways, as articles of or material for wearing-apparel, such as collars, bosoms, wristbands, gloves, shoe-linings, overcoats, overalls, aprons, under-skirts, facings, and linings.

Second, for household-use, as oil-cloths, floor-cloths, bed-clothes, table-covers, furniture-covers, window-shades.

Third, for surgical uses, such as bandages, catamenial bands, plaster-backs.

Fourth, for out-door sheltering, as for umbrella-covers, tent-covers, awnings, roof-covers, hay-caps, plant-protectors, carriage-covers.

Fifth, for bags and wrappers to contain and protect fruits, provisions, and other substances, such as flour and grain-bags, grocers' bags, tobacco-wrappers, covers for preserving-jars and bottles, strawberry and other small-fruit boxes.

Sixth, for printing-uses and stationery, as for maps, printing-paper for children's books, for bookbinding, book-covers, water-proof envelopes, tracing-paper.

Seventh, for travellers' use, such as for trunk-linings, band-boxes, portmanteaus, satchels, package and bundle-wrappers.

Eighth, in the mechanic arts, for bands, partitions, and covers, in various ways.

Finally, not to specify more classes or particulars, a few specific articles, to which the material is peculiarly applicable, such as toy-drum heads, cartridge and fixed-ammunition cases, may here be named.

What I claim as my invention, and desire to secure by Letters Patent, is—

The application of glycerine to the paper, after it has been subjected to the acid-process, and while still wet, substantially as herein specified.

Also, as a new article of manufacture, the material produced substantially as herein specified.

E. P. HUDSON.

Witnesses:
   J. S. BROWN,
   JNO. D. PATTEN.